(12) United States Patent
Moore

(10) Patent No.: US 10,052,910 B2
(45) Date of Patent: Aug. 21, 2018

(54) ILLUMINATED SYSTEM FOR USE WITH AMUSEMENT RIDES

(71) Applicant: Uremet Corporation, Santa Ana, CA (US)

(72) Inventor: Mark G. Moore, Laguna Beach, CA (US)

(73) Assignee: UREMET CORPORATION, Santa Ana, CA (US)

( * ) Notice: Subject to any disclaimer, the term of this patent is extended or adjusted under 35 U.S.C. 154(b) by 338 days.

(21) Appl. No.: 14/937,343

(22) Filed: Nov. 10, 2015

(65) Prior Publication Data

US 2017/0129281 A1 May 11, 2017

(51) Int. Cl.
| | | |
|---|---|---|
| H02K 7/00 | (2006.01) |
| B60B 19/00 | (2006.01) |
| B60B 17/00 | (2006.01) |
| B60B 27/00 | (2006.01) |
| B60Q 1/26 | (2006.01) |
| B60Q 1/00 | (2006.01) |
| H02K 1/17 | (2006.01) |
| H02K 1/26 | (2006.01) |
| H02K 11/042 | (2016.01) |
| H02K 11/04 | (2016.01) |
| A63G 7/00 | (2006.01) |

(52) U.S. Cl.
CPC .............. *B60B 19/00* (2013.01); *A63G 7/00* (2013.01); *B60B 17/0013* (2013.01); *B60B 27/0047* (2013.01); *B60Q 1/0088* (2013.01); *B60Q 1/2661* (2013.01); *B60Q 1/2696* (2013.01); *H02K 1/17* (2013.01); *H02K 1/26* (2013.01); *H02K 11/042* (2013.01); *H02K 11/046* (2013.01); *B60B 2900/572* (2013.01)

(58) Field of Classification Search
CPC .......... H02K 1/17; H02K 1/26; H02K 11/042; H02K 11/044; B60B 19/00; B60B 27/00
USPC .............. 310/67 A, 67 R; 362/500, 192, 103
See application file for complete search history.

(56) References Cited

U.S. PATENT DOCUMENTS

| | | |
|---|---|---|
| 2,128,045 A | 8/1938 | Hanna |
| 4,298,910 A | 11/1981 | Price |
| 4,363,502 A | 12/1982 | Bakerman |
| 4,648,610 A | 3/1987 | Hegyi |
| 4,893,877 A | 1/1990 | Powell et al. |
| 5,475,572 A | 12/1995 | Tseng |
| 5,497,302 A | 3/1996 | O'Donnell |

(Continued)

FOREIGN PATENT DOCUMENTS

| | | |
|---|---|---|
| DE | 2014465 A1 | 10/1971 |
| EP | 2345466 A1 | 7/2011 |

*Primary Examiner* — Hanh Nguyen
(74) *Attorney, Agent, or Firm* — Fulwider Patton LLP

(57) ABSTRACT

A wheel for a roller coaster or other amusement ride vehicle includes a self-contained illumination system. The wheel comprises a hub through which an axle is disposed, a web extending from the hub and including a plurality of apertures, and an annular seat at a periphery of the web for receiving a tire thereon, the annular seat cooperating with the hub and the web to define an annular cavity. A PCB is disposed in the annular cavity and has a plurality of LEDs aligned with the plurality of apertures on the web. A permanent magnet generator within the wheel powers the PCB and the LEDS, the generator completely confined to the interior of the wheel.

13 Claims, 6 Drawing Sheets

(56) References Cited

U.S. PATENT DOCUMENTS

| | | |
|---|---|---|
| 5,580,092 A | 12/1996 | Hsu et al. |
| 5,683,164 A | 11/1997 | Chien |
| 5,718,499 A | 2/1998 | De Caro |
| 5,730,520 A | 3/1998 | Hsu et al. |
| 5,779,344 A | 7/1998 | Tseng |
| 5,791,442 A | 8/1998 | Arnold et al. |
| 5,984,487 A | 11/1999 | McGhee |
| 6,116,763 A | 9/2000 | King |
| 6,398,395 B1 | 6/2002 | Hyun |
| 6,412,611 B1 | 7/2002 | Pribonic |
| 6,612,726 B1 | 9/2003 | Gloodt et al. |
| 6,619,823 B2 | 9/2003 | Dai |
| 6,659,237 B1 | 12/2003 | Pribonic |
| 6,688,636 B2 | 2/2004 | Han |
| 6,750,558 B1 | 6/2004 | Bruhwiler |
| 6,822,357 B2 | 11/2004 | Hung |
| 6,962,427 B2 | 11/2005 | Gloodt et al. |
| 7,048,421 B1 | 5/2006 | Allen-Atkins |
| 7,980,740 B2 * | 7/2011 | Hu .................. A63C 17/223 362/192 |
| 8,579,672 B2 | 11/2013 | Beutler et al. |
| 9,845,045 B2 * | 12/2017 | Fisher .................. B60Q 1/326 |
| 2003/0073546 A1 | 4/2003 | Lassanske et al. |
| 2003/0151924 A1 | 8/2003 | Gloodt et al. |
| 2004/0042227 A1 | 3/2004 | Gloodt et al. |
| 2004/0055836 A1 | 3/2004 | Pribonic et al. |
| 2005/0205712 A1 | 9/2005 | Aisenbrey |
| 2008/0087510 A1 | 4/2008 | Pribonic |
| 2009/0174295 A1 | 7/2009 | Lin |
| 2011/0177870 A1 | 7/2011 | Beutler et al. |
| 2011/0313607 A1 | 12/2011 | Checketts et al. |

* cited by examiner

ILLUMINATED SYSTEM FOR USE WITH AMUSEMENT RIDES

BACKGROUND

The present invention is directed to a high powered, compact modular illumination system particularly designed to be incorporated into a wheel of a vehicle, such as for example a wheel on an amusement attraction.

Amusement parks and tourist attractions strive to bring new and innovative changes to rides such as roller coasters and the like in order to catch patrons' attention and draw interest in such rides. Some changes include aesthetic modifications like repainting a roller coaster to give it a new appearance, changing a color scheme to alter the look and feel of the attraction, or redesigning the attraction. Painting a coaster can cost several hundreds of thousands of dollars, however, and in some cases the new appearance of the coaster cannot be seen during the evening hours of operation. Other attempts to provide an impactful and effective way to capture the imagination of amusement park enthusiasts have been met with mixed results.

One way to alter the appearance of a rollercoaster is to add lights to the attraction. Lights grab the attention of those in the immediate and intermediate areas, particularly at night when the effect is most pronounced. For this reason, illuminated amusement park rides have long been the standard at carnivals, amusement parks, and wherever such attractions are found. However, there are many challenges that come with incorporating lighting systems onto high speed vehicles that are subjected to the stresses and conditions found on today's roller coasters. Vibration, g-forces, weather, dust, power limitations, and weight concerns are but a few of the obstacles that must be overcome to provide a reliable and cost-effective system for illuminating amusement park rides.

One solution to the problem is attempted in U.S. Pat. No. 8,579,672 to Beutler, entitled "Lighting For Wheels," the content of which is fully incorporated herein by reference. The '672 patent describes an illumination system whereby rotation of a wheel past a fixed permanent magnet or electromagnet fixed on the car frame induces a current in an inductor on the wheel, which in turn powers the electrical system. In this manner, the wheel is illuminated by the rotation of the wheel as it moves along the track, obviating the need for batteries or a separate power supply system to activate the lights. However, the stator in the '672 patent is attached to the car or running gear, and is not a part of the wheel. This creates problems and challenges with: a) aligning the rotor and stator in close proximity, thereby limiting the efficiency of the power generation; b) conducting modifications to either the car or the wheel; and c) repairing and maintaining the wheel is made more difficult as the wheel and stator must always be aligned perfectly.

While the prior art has provided some techniques for illuminating wheels of amusement devices, the prior art still lacks a wheel with a lighting system that provides a more powerful, more compact, and reliable system to light the vehicle that also presents more options for visual effects not seen in the prior art.

SUMMARY OF THE INVENTION

The present invention is directed to a self-contained, modular lighting system for a wheel of a vehicle, such as a wheel on a roller coaster, amusement ride, or the like, wherein the rotation of the wheel along a track generates an electrical current that powers an illumination device such as an LED. The vehicle includes vertical, horizontal, and vehicles on tracks. The present invention generates power without any electrical connections outside of the wheel and without any elements of the illumination system residing outside of the wheel. Not having elements residing outside the wheel allows the inventive wheel to directly replace the existing wheel on an existing coaster without having to redesign any other parts of the car, train, or coaster or the need for new or specialized tools.

Generally the present invention is related to an illumination system for vehicles such as cars on roller coasters, the system being of modular construction that includes a wheel formed with a cylindrical cavity having an annular seat and a web formed with openings through which light may project. The cavity may be formed with a large diameter annular shoulder and an interior small diameter shoulder, each formed with respective grooves for receipt of respective locking rings mounted to a circuit board. The circuit board is retained between the shoulders or grooves and is preferably ring-shaped and nested in the cavity adjacent a rotor with a plurality of coils spaced annularly thereabout. Mounted adjacent the rotor is a stator comprising a stationary ring or plate upon which is secured circumferentially spaced permanent magnets. The stator is attached to the wheel by contact to ball bearings incorporated in the hub of the wheel and the magnetic force between the magnets and the rotor. The entire wheel is mounted to the car by means of an axle of the vehicle's running gear or a bogey. Mounted on the opposite side of the circuit board are LED lights (e.g., sixty watt LEDs) connected in circuit with the coils and aligned with openings in the wheel. When the wheel rotor rotates relative to stator, the coils pass through the magnets' magnetic field to induce a current in the coils, thereby energizing the LEDs to shine the resultant light beams through the openings. When the wheel tread becomes worn, it is possible to easily remove the stator and circuit board to repair or replace the tread on the wheel. The circuit board and rotor may then be re-installed and the stator, bearing permanent magnets, remounted to a new wheel.

These and other features of the present invention may best be understood with reference to the accompanying figures in conjunction with the detailed description of the inventor's preferred embodiments, as set forth below in the detailed description of the invention.

DETAILED DESCRIPTION OF THE PREFERRED EMBODIMENTS

Figure 1:
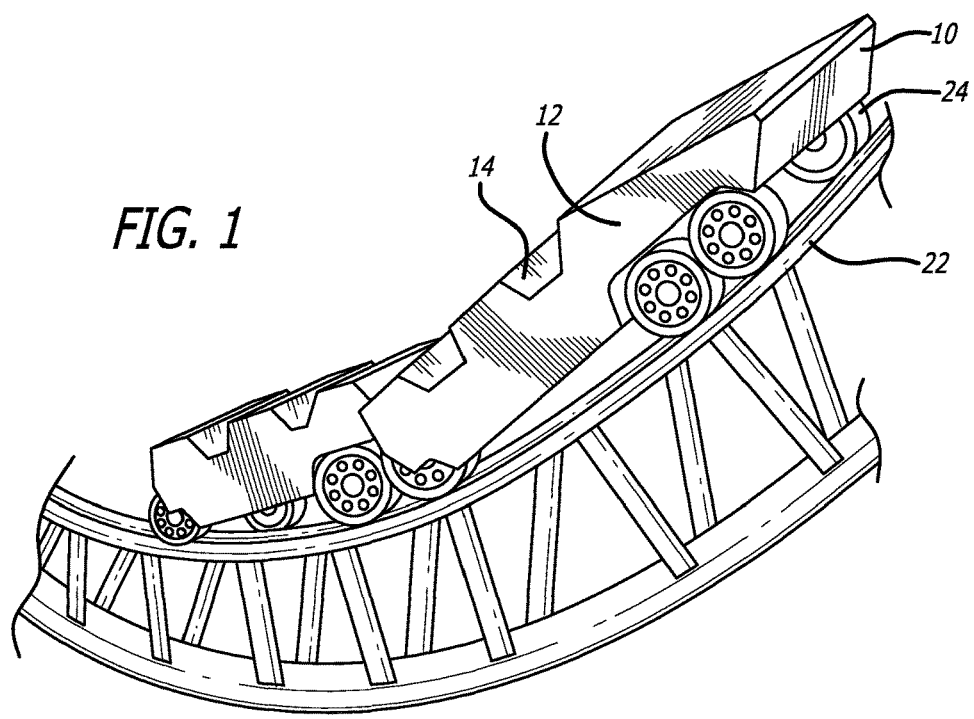
FIG. 1 is an elevated perspective view of an exemplary vehicle that may utilize the present invention.

FIG. 1 illustrates an amusement park ride illustrative of the type of vehicle that pertains to the present invention. It is to be understood that there are many applications of the present invention in vehicles of different varieties and that the invention is not limited to any particular type of vehicle or application. Rather, the invention may be used on any vehicle that may benefit or be enhanced by illumination. The vehicle 10 depicted in FIG. 1 is a roller coaster car that includes a chassis 12 and a seating compartment 14 with seats for the passengers. The seats will typically include back rests and neck or head restraints, depending on the particular roller coaster. Pull-over type safety bars may be used in place of safety belts or harnesses, and the seating compartment may be open or covered. The chassis 12 of the vehicle 10 is mounted to a frame that rides on a rail 22 or track, where the rail provides support and defines a path for the roller coaster car to follow during the ride. To keep the vehicle 10 on the rail, in many cases an arrangement is established whereby the rail 22 is captured between a visible (upper) set of wheels 24 and a hidden (lower) set of wheels or rollers. This configuration gives the illusion that the vehicle 10 is riding on top of the rail 22 when in fact the vehicle is confined about the rail in the vertical direction from above and below. Other types of arrangements are possible to secure the vehicle 10 to a rail or track, where the upper set of wheels 24 makes contact with the rail to rotate the wheels about an axle on the frame.

Figure 2:
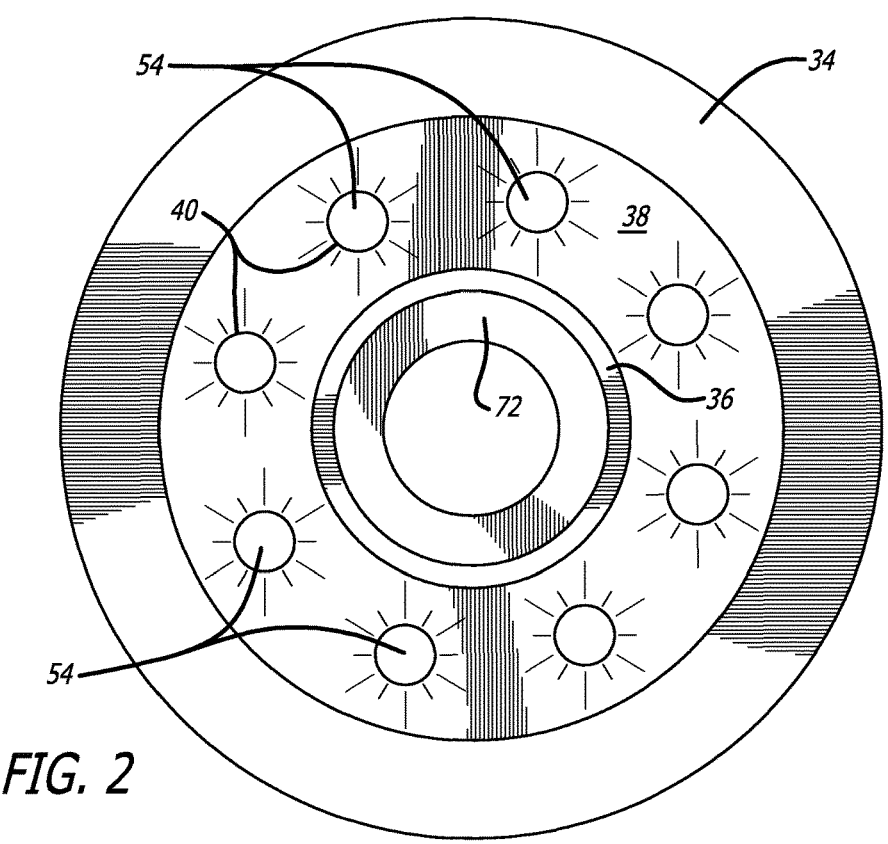
FIG. 2 is a front view of a first preferred embodiment of a wheel of the present invention.

FIG. 2 illustrates a first preferred embodiment of a wheel of the present invention generally having a rim 34, and a hub 36. A tread is typically mounted on the rim and can be made of a durable polymer material such as polyurethane that frictionally contacts the rail in such a manner that the wheel rotates about an axle in response to the interaction between the rail 22 and the tread. The rim 34 and hub 36 are connected or contiguous by means of a recessed web 38 that is perpendicular to the axis of the hub and rim and has a plurality of circumferentially spaced apart apertures 40. The wheel 24, comprised of the rim 34, hub 36, and web 38, has a first side that faces toward the vehicle and a second side that faces away from the vehicle, the first and second sides being separated by the web 38.

The web 38 is equipped with the apertures 40 that allows light to shine through. It is to be understood that the apertures 40 can differ in number, size, spacing, and shape to create different lighting characteristics depending upon the desired effect. The lighting system of the present invention utilizes lighting elements on the back side of the web 38 that coincide with the apertures 40 to emit high intensity light through the wheels as the vehicle is moving along the rails. A key feature of the invention is that the lighting system is completely contained in the wheel (no electrical connections to the frame) and is completely powered by the movement of the vehicle (no onboard batteries or exhaustible power supplies to occupy space and weight down the vehicle). To power the illumination system, an electricity generating system such as, for example, an axial flux induction generator, is incorporated into the wheel that induces an electrical current as the wheel rotates relative to the vehicle frame. The details of an exemplary embodiment of an illumination system of the present invention are described more fully below.

Figure 3:
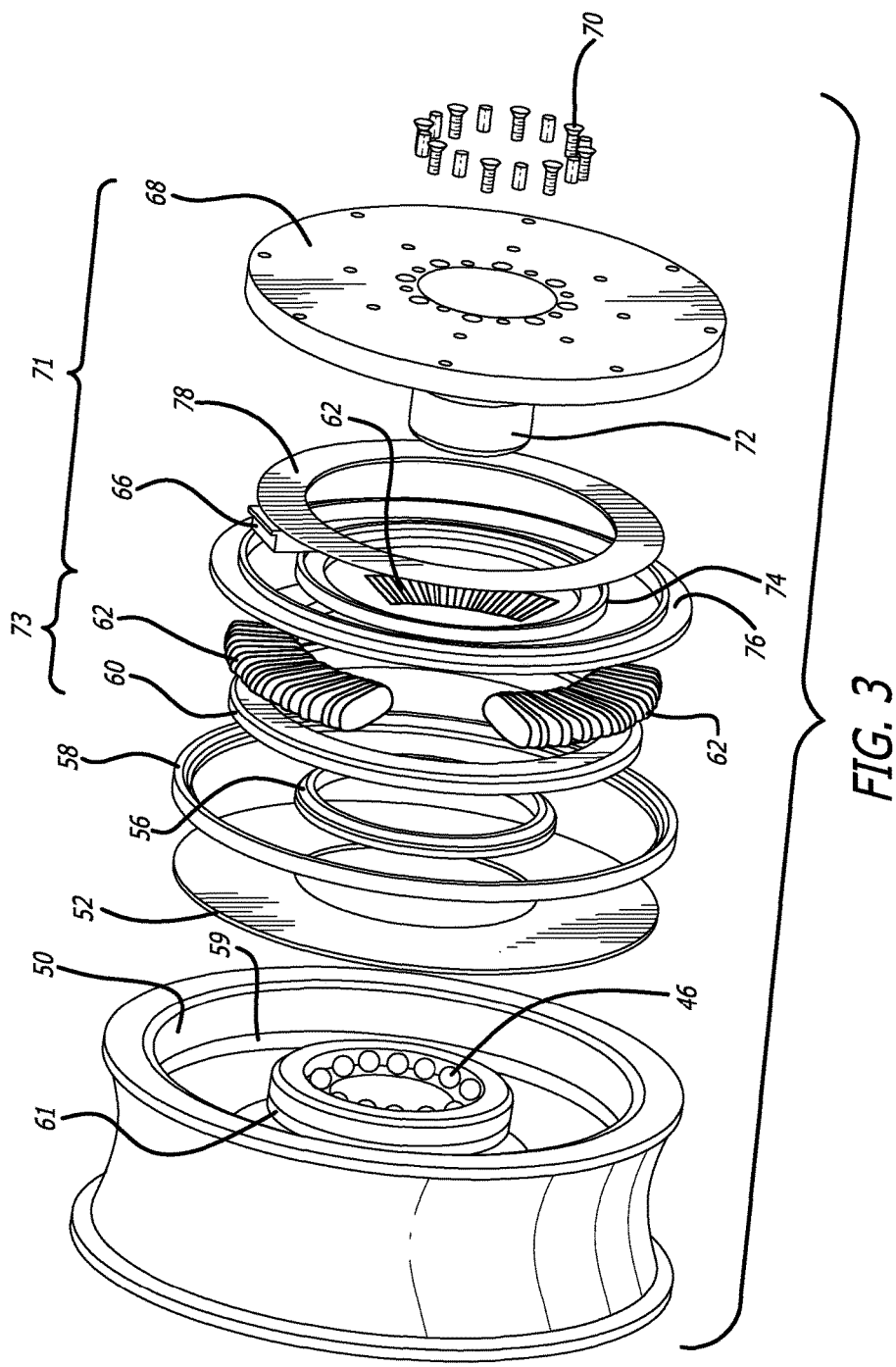
FIG. 3 is an exploded view of the elements of the illumination system of the present invention.

An inductor generator typically comprises a stator and a rotor. On the stator is a permanent magnet 66 (or electromagnet) and on the rotor is a series of coils 62, as seen in FIG. 3. When a coil 62 is passed by a magnet 66, the magnet's magnetic field induces an electric current in the coil that can be used to power a processor and an electrical circuit. To establish the current, the magnet and coil must be moved with respect to one another.

Figure 4:
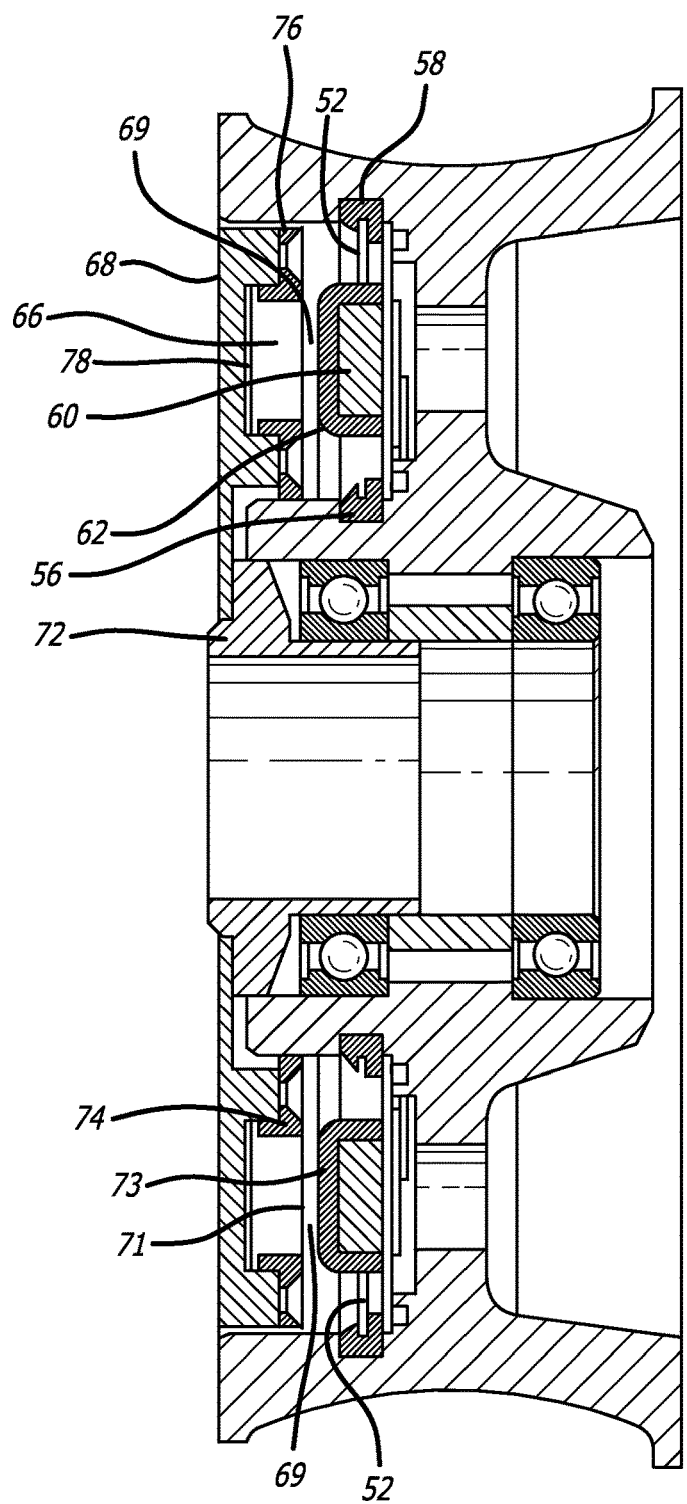
FIG. 4 is a cross-sectional view of the wheel.

In a preferred embodiment, an axial flux permanent magnet (AFPM) generator is implemented as illustrated in FIGS. 3 and 4. The stator 71 is comprised of a backplate 68 connected to a collar 72 by means of screws and pins 70. Attached to the backplate 68 is a flat iron ring 78 that has circumferentially mounted permanent magnets 66 (only one shown) held in place by an inner keeper ring 74 and an outer keeper ring 76 and associated snap rings (not shown) as needed. The rings 74,76, the backplate 68, the collar 72, the ring 78, and the magnets 66 remain stationary relative to the rest of the wheel due to the frictional contact of the backplate 68 relative to the rotor due to the contact of the backplate with the axle and running gear. Collar 72 is designed so as to be seated in the hub 36 adjacent the ball bearings 46.

The rotor 73 is comprised of three sets of coils 62, placed over a spiral-laminated silicon iron ring 60. The rotor 73 is attached to the inner side of a printed circuit board (PCB) 52. The PCB with the rotor 73 attached is placed in the annular cavity 50 of the wheel and held in place with an inner keeper ring 56 and an outer keeper ring 58 that engage grooves 59 and 61 in the rim 34 and hub 36, respectively. Snap rings (not shown) may be used to help secure the keeper rings 56,58.

When assembled, the wheel 24, stator 71, rotor 73, PCB 52 and associated fasteners, keeper rings and/or snap rings comprise a single unit. The rotor 73 and PCB 52 are held to the wheel by the keeper and/or snap rings and the stator 71 is held in contact with the ball bearings 46 through the attractive magnetic force between the permanent magnets 66 of the stator 71 and the silicon iron core of the rotor 73. The air gap 69 between the stator 71 and the rotor 73 is maintained by the specific dimensions of the collar 72 that rides within the ball bearings 46. When attached to the running gear or bogie of the vehicle 10, the stator 71 remains in a fixed position relative to the vehicle 10, while the balance of the wheel assembly, including the rotor 73, is free to rotate around the axle and collar 72. Because the entire electrical generating unit is confined to the wheel itself, there is no extraneous mechanical or electrical connections from the illumination system to the frame of the vehicle other than the axle of the wheel. This is a beneficial feature when a wheel is to be replaced.

Figure 5:
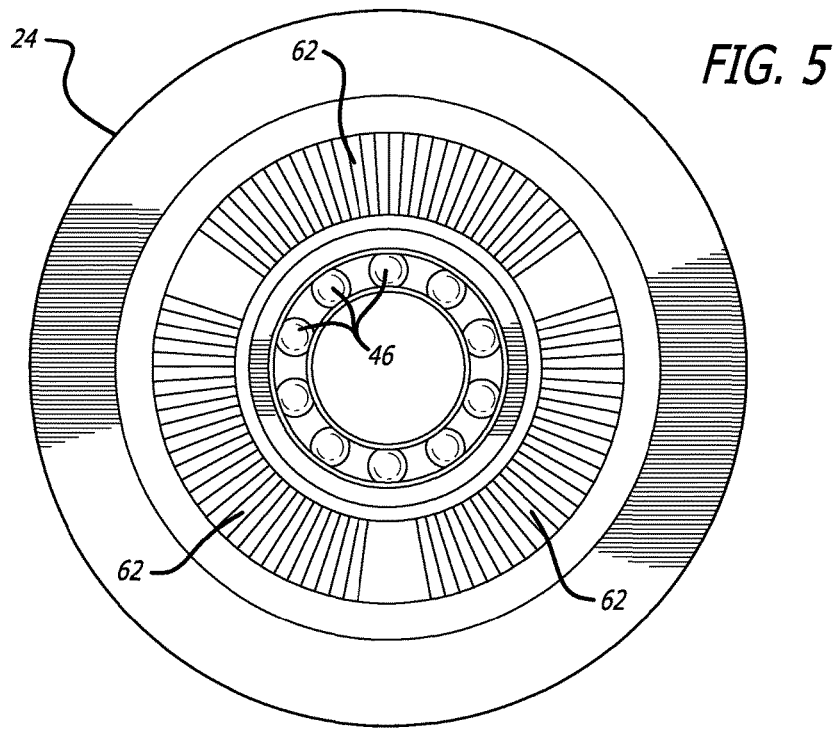
FIG. 5 is a front view of a rotor of the present invention with three sets of windings.

The PCB 52 is adjacent the rotor 73 (FIG. 4) of the axial flux permanent magnet ("AFPM") generator that drives the illumination system of the present invention. Typically LEDs or other lights are powered by either a battery or a source of fixed current. The present invention utilizes the rotation of the wheel to generate electricity using the AFPM generator. In a preferred embodiment, the rotor 73 of the AFPM generator is formed by three sets of coils 62 (FIG. 5) wound about the ferromagnetic iron ring 60 (FIG. 4), where each coil 62 is wound individually to maximize space by forming a relatively thin axial profile for the rotor 73. FIG. 5 illustrates the three sets of coils 62 with individual windings about the iron ring 60. Each set of coils 62 is electrically connected to the PCB 52 by a lead such that current generated in the rotor 73 can be used to drive the microprocessor and the other elements of the PCB 52, which in turn power the LEDs 54 to illuminate the wheel 24. Additional details of the PCB 52 are provided further below.

Figure 7:
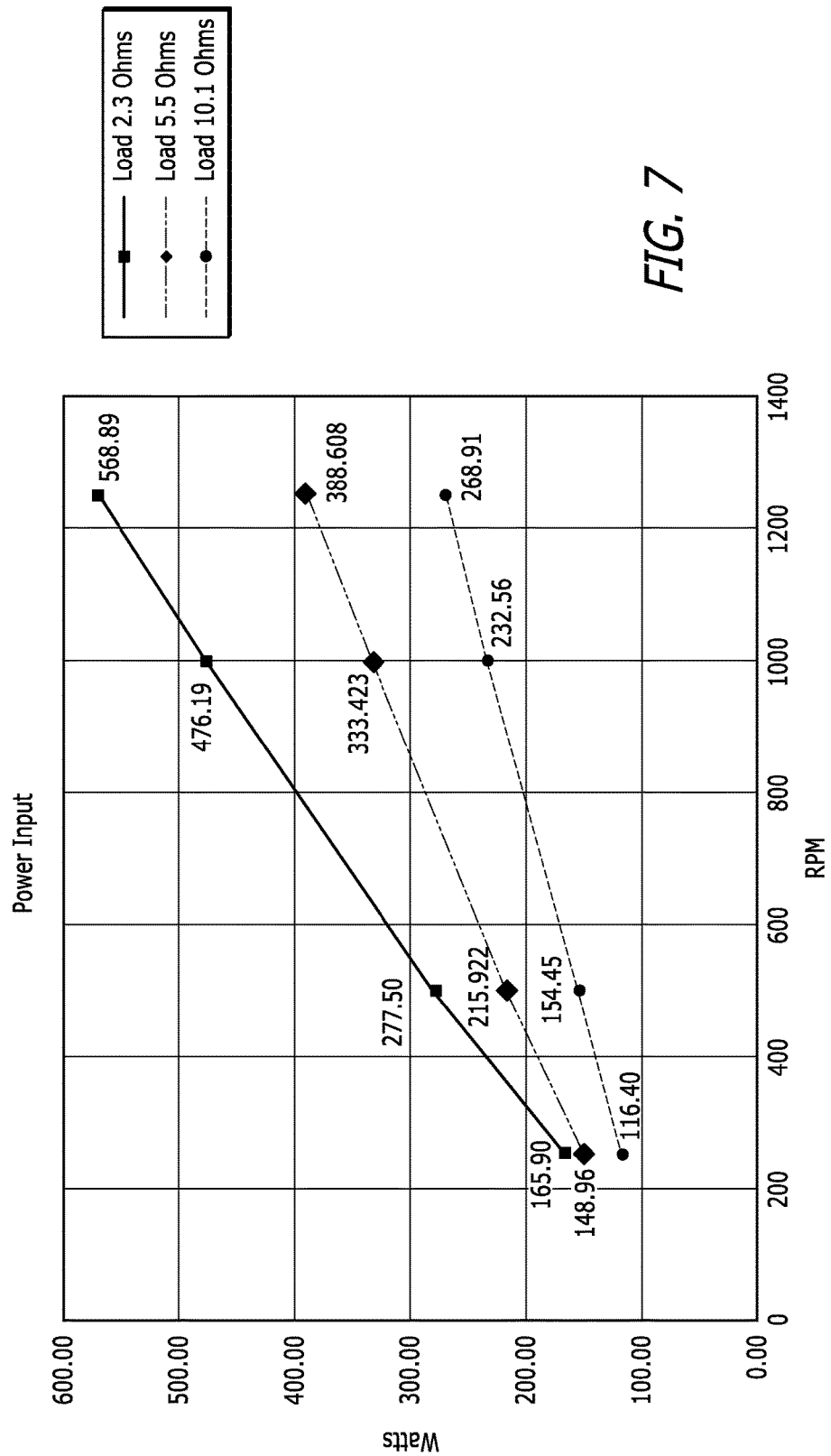
FIG. 7 is a graph showing the power input as a function of wheel RPM for three loading conditions.
Figure 8:
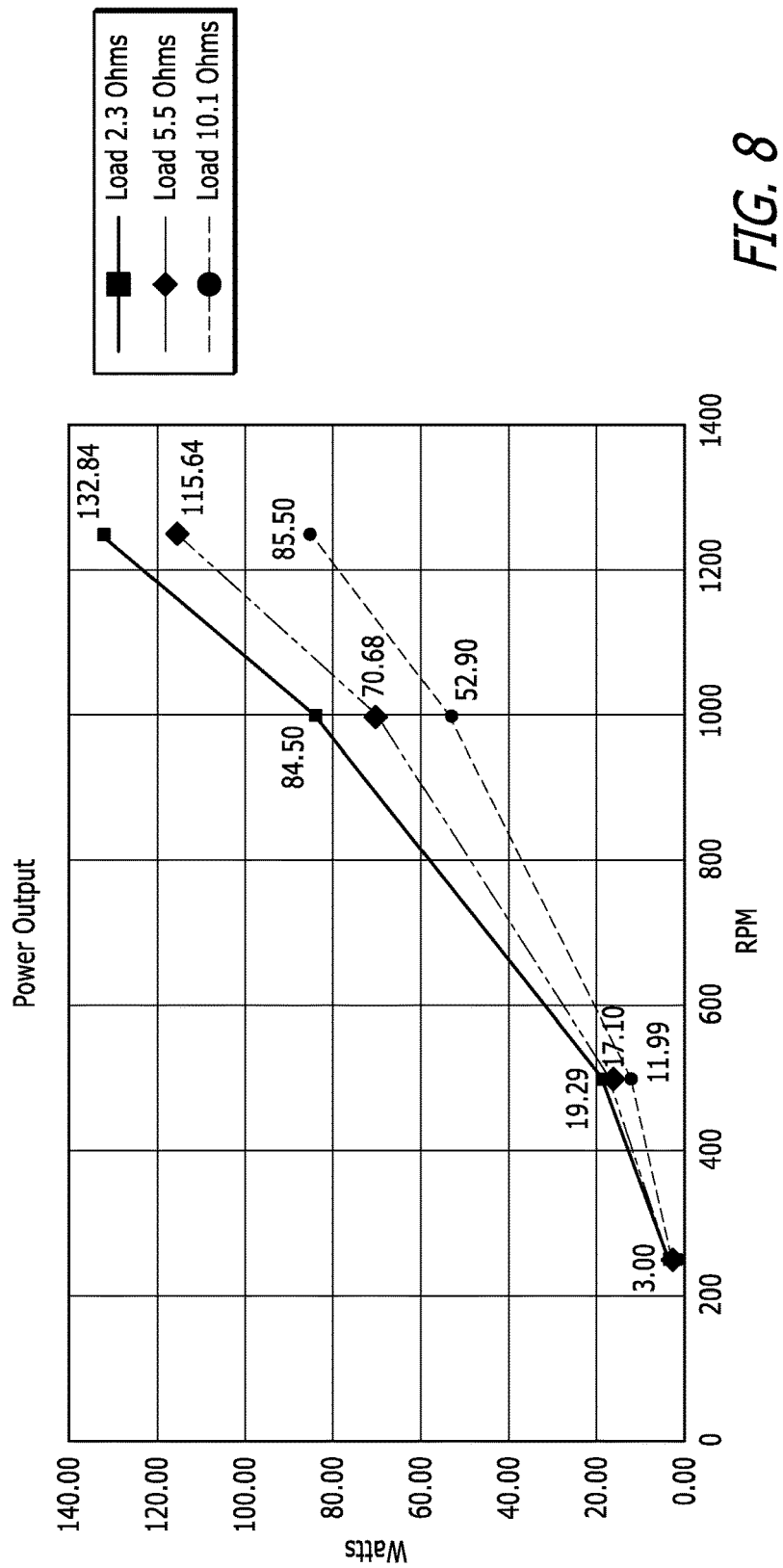
FIG. 8 is a graph showing the power output as a function of wheel RPM for three loading conditions.

FIGS. 7 and 8 represent test data for the power input and power output of three cases for the illumination system of the present invention. The three cases involve loads of 2.3 Ohms, 5.5 Ohms, and 10.1 Ohms. For the test cases, an air gap of 0.003 inches was used. The rotor of the three-phase generator was comprised of eighteen (18) individual coils of nine (9) turns each utilizing a 26 AWG LITZ wire from New England Wire Tech, potted with BJB TC-1611 Epoxy. The stator size had an inner radius of 1.9 inches and an outer radius of 3.8 inches. The magnet plate had an inner radius of 2.6 inches and an outer radius of 3.4 inches. The results of the test are documented in the following table:

| Load | RPM | | | |
|---|---|---|---|---|
| | 250 | 500 | 1000 | 1250 |
| 2.3 Ohms | | | | |
| Vin | 79 | 75 | 72 | 74 |
| I in | 2.1 | 3.7 | 6.7 | 7.7 |
| Pin | 166 | 278 | 476 | 569 |
| Vout | 2.6 | 5.9 | 13 | 16.2 |
| I out | 1.3 | 3.1 | 6.5 | 8.2 |
| Pout | 3 | 18 | 85 | 133 |
| 5.5 Ohms | | | | |
| Vin | 78 | 74 | 70 | 70 |
| I in | 1.9 | 2.9 | 4.8 | 5.5 |
| Pin | 149 | 216 | 333 | 389 |
| Vout | 4.1 | 9 | 18.6 | 23.6 |
| I out | 0.9 | 1.9 | 3.8 | 4.9 |
| Pout | 4 | 17 | 71 | 116 |
| 10.1 Ohms | | | | |
| Vin | 78 | 73 | 68 | 69 |
| I in | 1.5 | 2.1 | 3.4 | 3.9 |
| Pin | 116 | 154 | 233 | 269 |
| Vout | 5.3 | 10.9 | 23 | 28.5 |
| I out | 0.6 | 1.1 | 2.3 | 3 |
| Pout | 3 | 12 | 53 | 86 |

The tests show that powers at least 133 watts can be generated with a preferred embodiment of the invention, well above that of previously generated prior art systems. This enables an amusement park operator to provide a highly illuminated car certain to catch patrons' attention and create a visually stimulating accent to an existing attraction. Moreover, because the entire illumination and power system is self-contained inside the wheel, there are no loose components that can become dislodged and damage the attraction or passengers. The system can easily achieve sixty watts of power even for moderate loads at RPMs between 800 and 1100, and at a load of 5.5 Ohms sixty watts of power can be achieved at a mere 900 RPMs.

Figure 6:
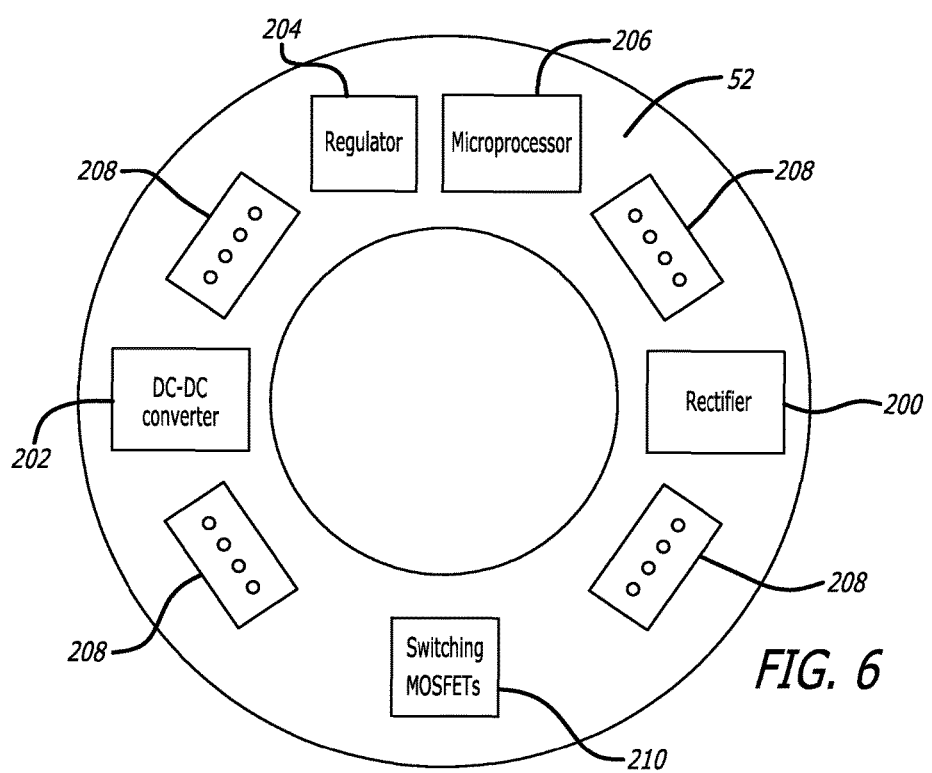
FIG. 6 is a schematic of a PCB of the present invention.

FIG. 6 illustrates a schematic of a PCB 52 that can be utilized to control and operate the LEDs 54 that illuminate the wheel 24 of the present invention. A wide area input rectifier 200 enables the alternating current generated by the AFPM generator to a direct current for a wide number of inputs (RPMs, loads, etc.). The output of the rectifier is received by a high efficiency, wide input DC-DC converter 202 to adjust the DC voltage from the rectifier to a relatively constant, manageable DC voltage required by the PCB 52. A low power regulator 204 ensures that a maximum power to the PCB is not exceeded. The microprocessor 206 is powered by the output of the DC-DC converter 202, and includes instructions for illuminating the LEDs upon certain conditions and criteria as set forth above, be it velocity, position, ambient light, acceleration, position with respect to the earth's plane, position on the track or rail, or a host of other possible conditions. The LEDs are mounted on brackets 208 and connected to the microprocessor 206 by a bus that charges the LEDs using power generated from the AFPM generator when signaled to illuminate by the microprocessor. The LEDs each are equipped with a LED heat sink to remove excess heat from the LED and protect the integrity of the board in the event of overheating. Switching mosfets 210 or other switching elements control the current through the bus and to the LEDs 54.

The illumination system of the present invention is independent of the coaster train and does not require any connections outside of the wheel other than the normal spindle-axle coupling. A powered PCB and generator coils comprise a power management system that illuminates LEDs mounted on or to the PCB. An LED heat sink is incorporated into the PCB, and LED chips may be directly mounted on the heat sinks to eliminate the need to mount LED packages on a separate heat sink. The LED heat sink board and power PCB are fastened together as a single package, where fasteners such as copper standoffs provide the power circuit to the LED heat sink board. Because of the strong magnetic attraction, the power board mounting system requires a reliable mounting system such as the one described. The circuit board is circular with a center portion removed (flat toroid), and is seated on a step possibly using an O-ring between the board and aluminum wheel to act as a cushion. In a preferred embodiment, a tall groove (0.200"-0.300") similar to a snap ring retainer is machined around the inside of the circumference of the wheel hub at both the inner diameter and outer diameter of the PCB.

While some preferred embodiments of the present invention have been described and/or depicted in the drawings, it is to be understood that the present invention is not so narrowly confined. One of ordinary skill in the art would readily appreciate a number of substitutions and modifications to the present invention, and the scope of the present invention is intended to include and incorporate all such substitutions and modifications. For example, while an axial flux generator is described, it is to be understood that a radial flux generator could also be used to generate the electricity needed to power the system. Accordingly, the scope of the present invention should not be limited by any particular drawing or description herein, but rather by the words of the appended claims using their ordinary and customary meanings, consistent with the descriptions and depictions herein.

I claim:

1. A wheel having a self-contained illumination system, comprising:
   a hub;
   a web extending from the hub and including a plurality of apertures;
   an annular seat at a periphery of the web for receiving a tire thereon, the annular seat cooperating with the hub and the web to define an annular cavity;
   a printed circuit board disposed in the annular cavity, the printed circuit board having a plurality of illumination devices aligned with the plurality of apertures on the web and a microprocessor for controlling the illumination of the illumination devices, the printed circuit board affixed to the hub and the annular seat;
   a stator enclosing the cavity, the stator including at least one permanent magnet that induces a current in a plurality of coils as a result of movement of the plurality of coils past the at least one permanent magnet;
   a rotor comprising the plurality of coils, the rotor fixed in rotational relationship with the printed circuit board and electrically connected thereto, and mounted for relative rotation with respect to the stator; and
   whereby an induced current in the plurality of coils powers the illumination devices and the microprocessor.

2. The wheel of claim 1, wherein the printed circuit board includes a voltage rectifier and a direct current converter.

3. The wheel of claim 2, wherein the printed circuit board further includes a power regulator and an illumination device heat sink.

4. The wheel of claim 3, wherein the heat sink comprises a heat sink board coupled to the printed circuit board.

5. The wheel of claim 1, wherein the rotor and the stator cooperate to establish an axial flux permanent magnet generator.

6. The wheel of claim 5, wherein the rotor is comprised of at least three sets of coils and wherein each set of coils is wound individually.

7. The wheel of claim 1, wherein the printed circuit board is held in place within the cavity of the wheel by first and second keeper rings.

8. The wheel of claim 1, wherein the rotor further comprises a spiral laminated silicon iron ring about which the coils are wound.

9. The wheel of claim 1, wherein the rotor and the stator cooperate to establish a radial flux generator.

10. The wheel of claim 1 having an output power generation of at least sixty watts at a wheel rotation of no more than 1100 RPMs.

11. The wheel of claim 10 having a power generation of at least sixty watts at a wheel rotation of no more than 900 RPMs.

12. The wheel of claim 1 wherein the illumination device is an LED.

13. The wheel of claim 12 wherein the LED is rated for sixty watts.

* * * * *